United States Patent [19]

Shimizu

[11] Patent Number: 4,765,426

[45] Date of Patent: Aug. 23, 1988

[54] MOTOR DRIVEN POWER STEERING SYSTEM

[75] Inventor: Yasuo Shimizu, Saitama, Japan

[73] Assignee: Honda Giken Kogyo Kabushiki Kaisha, Tokyo, Japan

[21] Appl. No.: 33,409

[22] Filed: Mar. 31, 1987

[30] Foreign Application Priority Data

Mar. 31, 1986 [JP] Japan .................................. 61-73816

[51] Int. Cl.$^4$ .............................................. B62D 5/04
[52] U.S. Cl. .................................. 180/79.1; 318/293; 361/23
[58] Field of Search ....................... 180/79.1, 141, 142, 180/143; 307/10 R; 318/280, 282, 291, 293, 294, 299, 317; 361/23, 24

[56] References Cited

U.S. PATENT DOCUMENTS

| | | | |
|---|---|---|---|
| 4,394,605 | 7/1983 | Terawaza | 318/291 X |
| 4,557,342 | 12/1985 | Drutchas | 180/142 X |
| 4,574,229 | 3/1986 | Kim | 361/24 X |
| 4,574,903 | 3/1986 | Hashimoto et al. | 180/79.1 |
| 4,645,025 | 2/1987 | Ohe et al. | 180/79.1 |

FOREIGN PATENT DOCUMENTS 54-4309  1/1979  Japan ................................ 318/293
2132950  8/1984  United Kingdom .

Primary Examiner—John J. Love
Assistant Examiner—Charles R. Watts
Attorney, Agent, or Firm—Lyon & Lyon

[57] ABSTRACT

A power steering system includes an electric motor associated as an assistive power source with a steering mechanism. The steering system includes an electric power source for the motor, a motor driver connected to the electric power source for driving the motor, and a control system for controlling the motor driver. The steering system also includes a relay circuit for selectively electrically connecting and disconnecting the motor driver and the motor, thereby to effectively prevent a closed loop being formed which would otherwise provide a short circuit between the input terminals of the motor when the steering mechanism is manually operated without assistive steering power upon a failure of the power steering system.

7 Claims, 9 Drawing Sheets

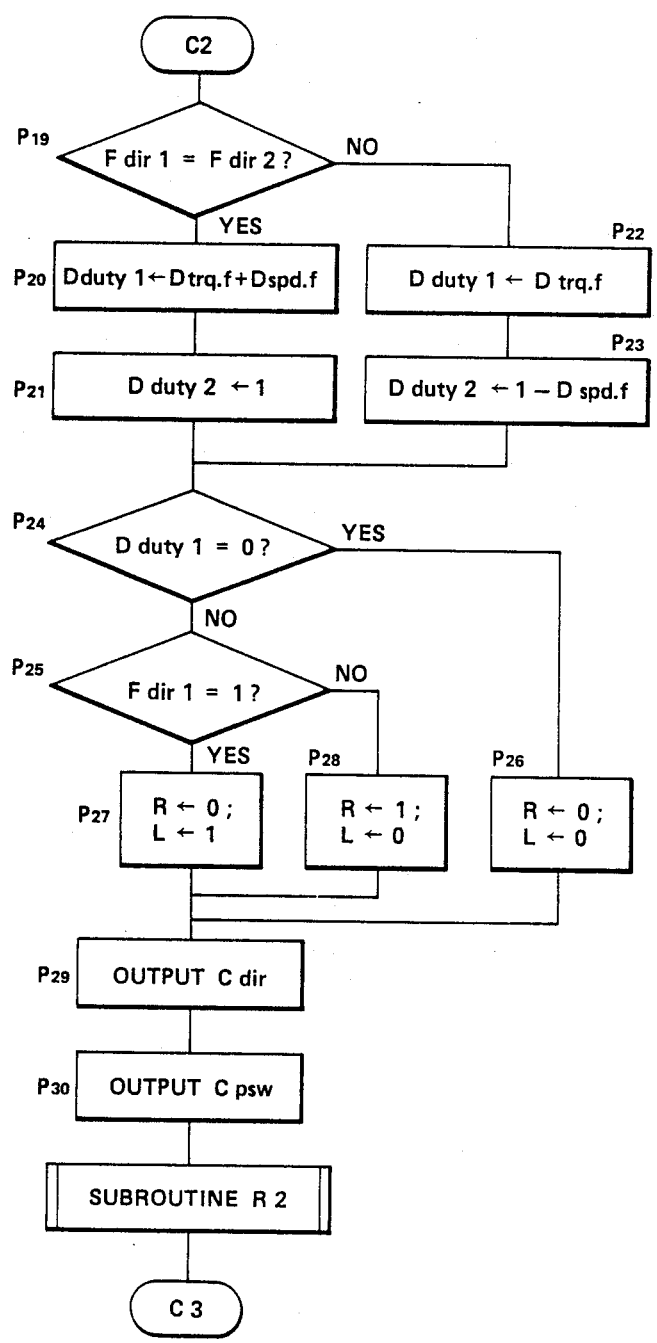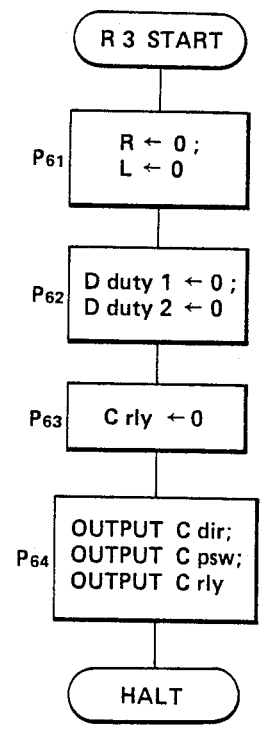

MOTOR DRIVEN POWER STEERING SYSTEM

BACKGROUND OF THE INVENTION

1. Field of the Invention

The present invention relates to a motor-driven power steering system for automotive vehicles, and more particularly to a motor-driven power steering system which employs an electric motor for generating assistive steering power.

2. Description of the Relevant Art

Many automotive power steering systems employ hydraulic mechanisms or electric motors as assistive power sources. In power steering systems using electric motors, the assistive power source can be controlled directly by an electronic control unit (hereinafter referred to as an "ECU"). Such power steering systems are therefore more advantageous than power steering systems incorporating hydraulic mechanisms. Hydraulic power steering systems require a costly hydraulic control device or an additional mechanism which operatively interconnects an ECU and a hydraulic mechanism. An ECU may comprise a microcomputer, and such a control unit can be programmed to execute a complex control sequence. A typical motor-driven power steering system comprises a steering mechanism, an electric motor operatively coupled to the steering mechanism for generating assistive steering power, a power supply for supplying electric power to the motor, a motor driver connected to the power supply for driving the motor, and a controller for controlling the motor driver. The controller includes a microcomputer and a plurality of sensors connected to the microcomputer. The sensors detect basic factors such as steering torque acting on the steering shaft of an automobile and apply electric signals representative of the detected basic factors to the microcomputer. The microcomputer processes the supplied electric signals and issues a control signal for the motor driver.

It is advantageous if the electric motor is a DC motor and the motor driver is controlled by a chopper, particularly a pulse-width modulation (PWM) system, for controlling the current flowing through the DC motor. The PWM system can control the torque generated by the motor in a wide range since the motor is turned on and off in very short periods. In DC motor control, various motor drivers have been proposed and widely used for the purposes of changing the direction of rotation of the motor and controlling the motor torque through PWM systems. These purposes can well be served by a motor driver in the form of a bridge circuit, which will be described with respect to an embodiment and alternatives of the present invention. Such a motor driver has four terminals positioned respectively at the four corners of a rectangular network on a circuit diagram, with an element/elements connected between adjacent ones of the terminals. The paired terminals on a diagonal line are connected to the power supply, whereas the paired terminals on the other diagonal line are connected to the motor. The element/elements between adjacent terminals may be a combination of a diode and a switch which are connected parallel to each other, or may be a switching element with a diode incorporated therein. The diode/switch combination and the switching element are electrically equivalent to each other. The motor driver controls the PWM-driven motor such that it is repeatedly connected to and disconnected from the power supply at short periods through switching elements. Such disconnection between the motor and the power supply induces a considerable current in the motor. The diodes in the motor driver bridge form a loop which allows the induced current to flow therethrough, causing the opposite terminals of the motor to be substantially short-circuited. The loop will hereinafter be referred to as a "temporary short-circuiting loop".

The motor driver of the above arrangement has desired characteristics as a motor driver for a motor-driven power steering system. However, it has one disadvantage. Since the motor driver forms a temporary short-circuiting loop continuously during normal operation thereof, the "temporary" short-circuiting loop will remain present when the motor driver fails, and hence a closed loop which provides a short circuit between the input terminals of the motor tends to be formed continuously, but not temporarily.

Steering systems with assistive power sources are constructed on the principle of a fail-safe concept that the steering systems can manually be operated without power assistance should the assistive power sources fail to operate properly. When a power steering system with an electric motor is manually operated upon a power source failure, the output shaft of the motor is rotated by the steering effort of the automobile driver through a power transmission mechanism coupled to the motor output shaft, so that the motor operates as a generator. Where the "continuous" short-circuiting loop is formed at this time, a current is permitted to flow through the short-circuiting loop. Therefore, the motor functions as an electromagnetic brake, and some torque is required to rotate the motor. As a consequence, some additional steering effort is needed to manually operate the steering mechanism.

SUMMARY OF THE INVENTION

In view of the aforesaid problems of the conventional motor-driven power steering systems, it is an object of the present invention to provide a motor-driven power steering system having an electric motor for generating assistive steering power, motor driver means for driving the motor, and control means for controlling the motor driver means, the power steering system including an arrangement for effectively preventing the formation of a closed loop which would short-circuit between the input terminals of the motor when the steering system would be manually operated.

According to the present invention, a power steering sytem includes a steering mechanism, an electric motor operatively coupled to the steering mechanism for generating assistive steering power, a power source for energizing the motor, motor driver means connected to the power source for driving the motor, and control means for controlling the motor driver means. The power steering system further includes switch means for selectively electrically connecting and disconnecting the motor driver means and the motor.

According to a preferred embodiment of the present invention, the motor driver means includes a bridge circuit comprising two input terminals, two output terminals, and four bridge branches connected between the terminals. Each of the bridge branches comprises either a combination of a switching element controlled by the control means and a diode connected parallel to the switching element, or an element equivalent to such a combination.

The above and further objects, details and advantages of the present invention will become apparent from the following detailed description of preferred embodiments thereof, when read in conjunction with the accompanying drawings.

BRIEF DESCRIPTION OF THE DRAWINGS

FIGS. 5(a) through 5(f) are a flowchart of operation of a microcomputer unit in the control system shown in FIG. 2;

DETAILED DESCRIPTION OF THE PREFERRED EMBODIMENTS

Figure 1:
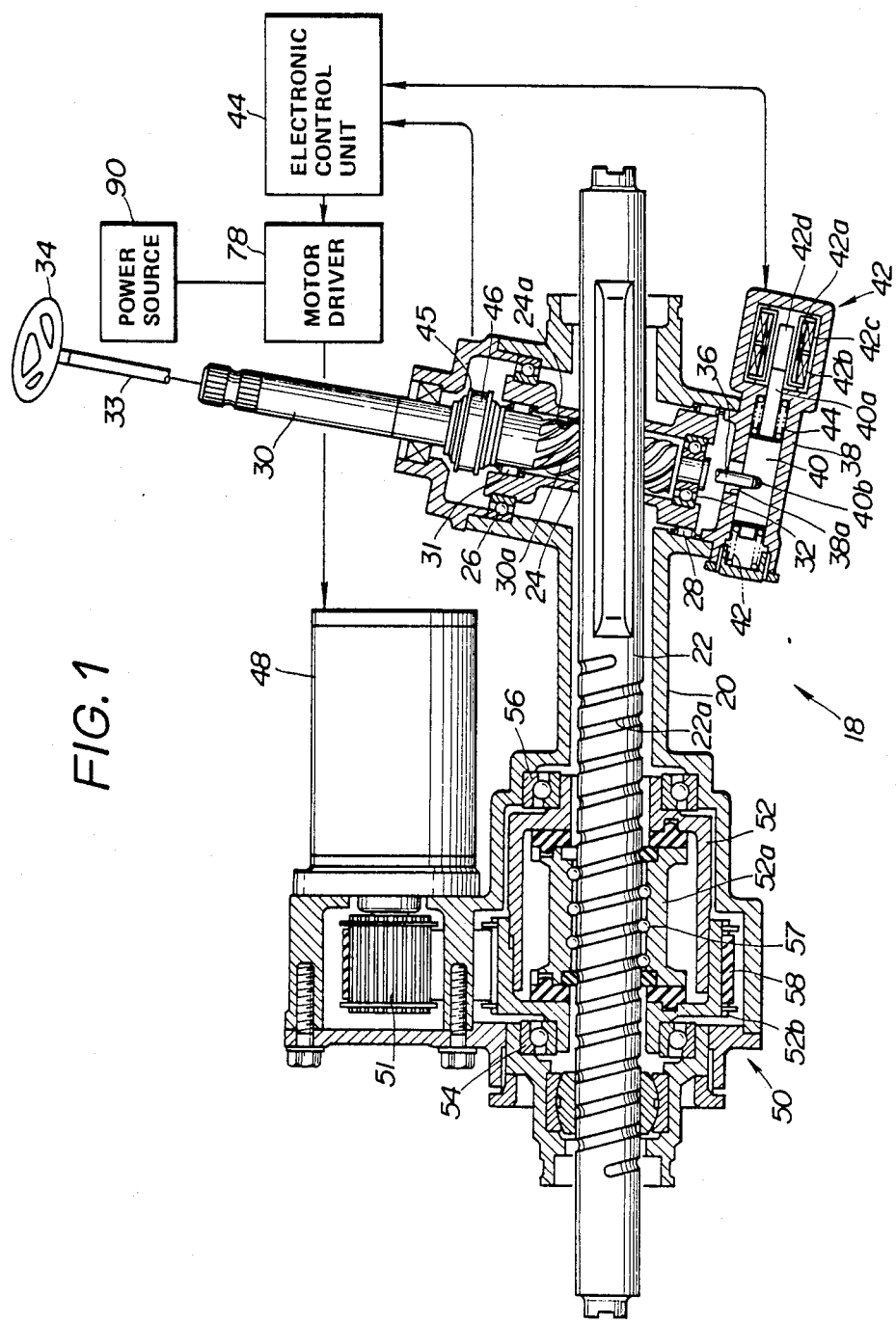
FIG. 1 is a longitudinal cross-sectional view of a steering mechanism in a motor-driven power steering system according to a preferred embodiment of the present invention.

As shown in FIG. 1, a motor-driven power steering according to an embodiment of the present invention includes a steering mechanism 18 of the rack-and-pinion type having a housing 20 mounted on an automobile body and accommodating an axially slidable rack 22. The rack 22 has its opposite ends adapted to be coupled to the steering knuckles (not shown) of steerable or dirigible road wheels through tie rods (not shown). A substantially cylindrical pinion case 24 which is rotatable about its own axis is supported at its opposite ends in the housing 20 by means of bearings 26, 28. The pinion case 24 has a substantially cylindrical hole 24a defined therein, with its axis extending parallel to and slightly spaced from the axis of rotation of the pinion case 24. Thus, the axis of the hole 24a is held in eccentric relation to the axis of rotation of the pinion case 24. The steering mechanism 18 includes an input shaft 30 having a pinion 30a on its lower end disposed in the eccentric hole 24a of the pinion case 24. The input shaft 30 is rotatably supported in the pinion case 24 by means of bearings 31, 32 in axial alignment with the eccentric hole 24a. The upper end of the input shaft 30 is connected to a steering shaft 33 through a suitable coupler, with a steering wheel 34 fixed to the steering shaft 33. The steering shaft 33 and the steering wheel 34 are general members and schematically shown in FIG. 1. The rotatable pinion case 24 can be angularly moved about its own axis in either direction from its neutral angular position when the steering mechanism is operated. The pinion case 24 has an opening (not shown) in its side facing the rack 22, and a pinion 30a of the input shaft 30 meshes with the teeth (not shown) of the rack 22 through the opening of the pinion case 24. The pinion case 24 also has on its lower end a downwardly extending pin 36 positioned eccentrically with respect to the axis of rotation of the pinion case 24. A cylinder 38 is secured to the housing 20 near the lower end of the pinion case 24, and houses a slidable pinion 40 therein, the pinion 40 having a rod 40a extending in the axial direction of the cylinder 38. Springs 42, 44 are held against the opposite ends of the piston 40 for normally urging the piston 40 into its neutral position. The pinion 40 has a notch 40b defined in its central portion, and the pin 36 on the lower end of the pinion case 24 extending through an opening 38a defined in the cylinder 38 into the notch 40b of the piston 40.

Figure 2:
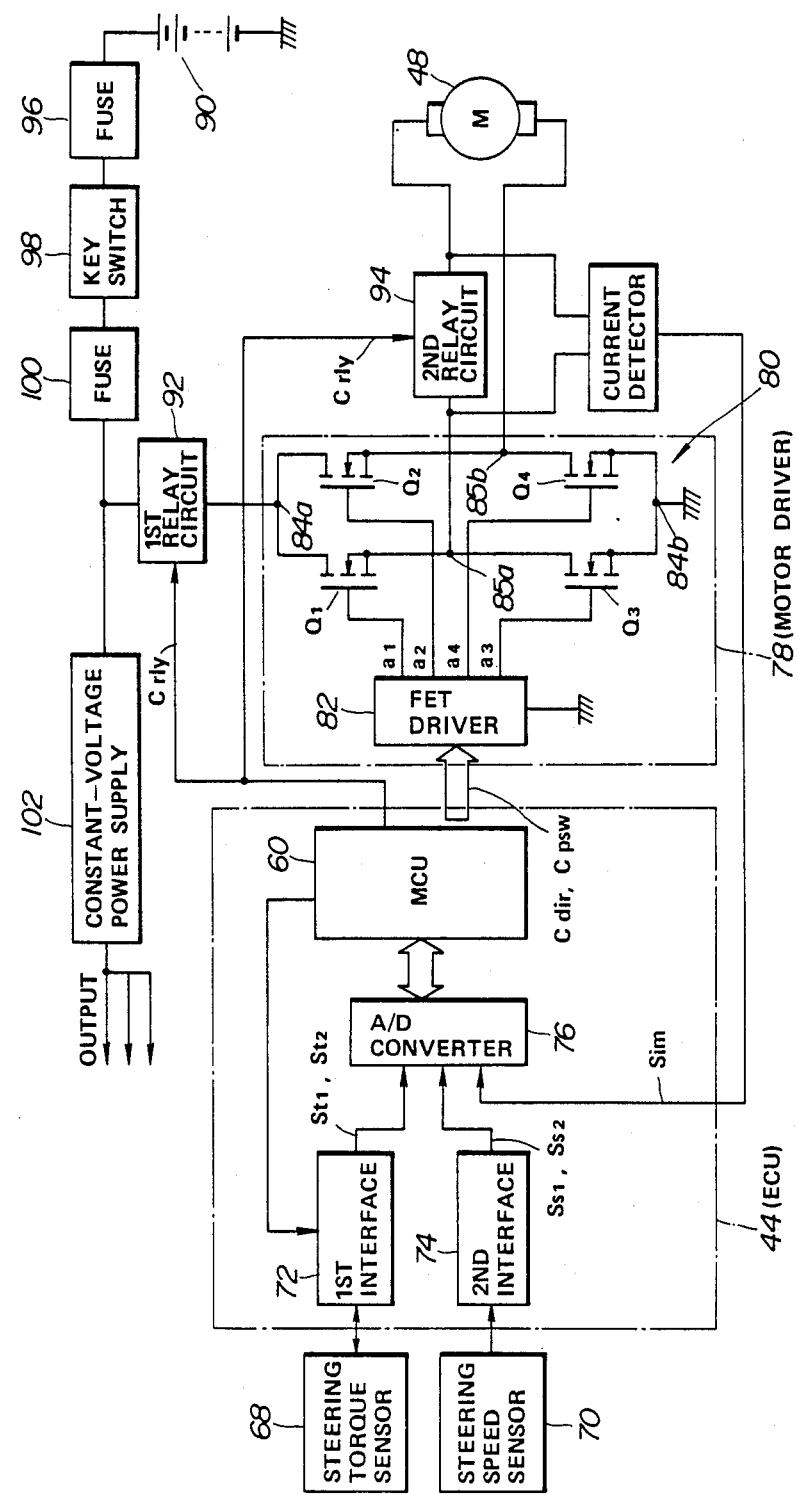
FIG. 2 is a block diagram of a control system in the motor-driven power steering system shown in FIG. 1, the control system including an electronic control unit, a motor driver, and associated elements.

When no manual steering effort is applied to the steering wheel 34 and hence the input shaft 30, the piston 40 is positioned in the neutral position under the bias of the springs 42, 44. At this time, the pinion case 24 is held in its neutral angular position through engagement of the eccentric pin 46 in the notch 40b. When the pinion case 24 is in the neutral angular position, the axis of the input shaft 30 is positioned on a side of the rotational axis of the pinion case 24 which is remote from the rack 22. When a steering effort is imposed on the input shaft 30, a force is applied from the pinion 30a to the rack 22 and at the same time a reactive force is applied from the rack 22 to the pinion 30a. Since the axis of the input shaft 30 is eccentric with respect to the pinion case 24, the reactive force acts on the pinion case 24 as a torque tending to rotate the pinion case 24. The rotation of the pinion case 24 causes the pinion 40 to move from its neutral position, and hence enables the springs 42, 44 to produce a force to return the piston 40 to its neutral position. The returning force produced by the springs 42, 44 acts on the eccentric pin 36 as a torque to rotate the pinion case 24. The torque applied by the input shaft 30 and the torque applied by the piston 40 act in opposite directions. The piston case 24 is angularly positioned to put these torques in equilibrium or a state of balance. Therefore, the amount of displacement of the piston 40 from its neutral position is determined by the magnitude of the steering torque applied to the input shaft 30. A differential transformer 42 for converting the amount of displacement of the piston 40 to a corresponding electric signal is mounted on one end of the cylinder 38. The differential transformer 42 and the above structure jointly serve as a steering torque sensor (which is shown as a block 68 in FIG. 2).

Figure 6:
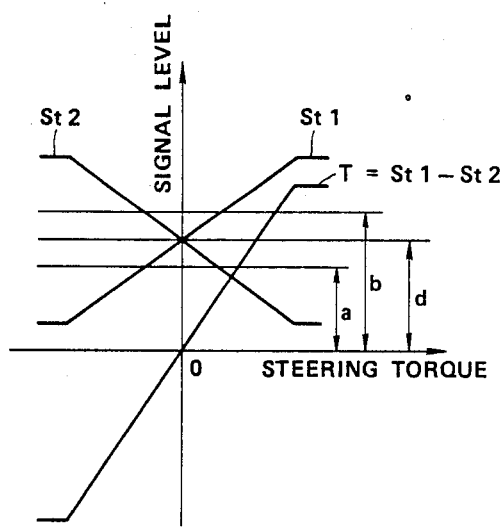
FIG. 6 is a graph showing output characteristics of a steering torque sensor in the control system of FIG. 2.

The differential transformer 42 has a casing integral with the cylinder 38 and a primary winding 42a and a pair of secondary windings 42b, 42c which are disposed in the casing in concentric relation to the cylinder 38. The differential transformer 42 also includes a movable core 42d of a ferromagnetic material which is fixed to a rod 40a of the piston 40. The core 42d is movable with respect to the windings in response to axial movement of the piston 40. The primary winding 42a is supplied with an alternating current of constant level from an electronic control unit (hereinafter referred to as an "ECU") 44 of a control system. The secondary windings 42b, 42c produce, as voltage signals St1, St2, voltages having levels commensurate with the position of the movable core 42d, i.e., the steering torque applied to the input shaft 30. The secondary windings 42b, 42c have the same characteristics, and the voltage levels of their output signals St1, St2 vary substantially linearly as the steering torque varies, as shown in FIG. 6, in a normal operation range. The output signals St1, St2 are the mirror images of each other, i.e., symmetrical with respect to the axis of output voltage as shown in FIG. 6. These output voltages are supplied to the ECU 44, in which the difference between the output voltages is computed as a value T indicative of the steering torque applied to the steering shaft 33. The torque-indicating value T is also shown in FIG. 6.

Figure 7:
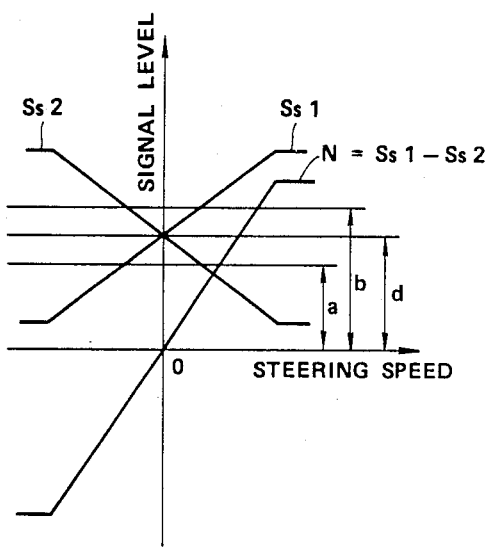
FIG. 7 is a graph showing output characteristics of a steering speed sensor in the control system of FIG. 2.

The power steering system includes a steering speed sensor (shown as a block 70 in FIG. 2) associated with the input shaft 30 for detecting the direction and magnitude of rotation of the input shaft 30 and hence the steering wheel 34 coupled to the input shaft 30. The steering speed sensor 70 comprises a sensor unit (not shown) mounted on the housing 20 of the steering mechanism 18 and operatively coupled to the input shaft 30 through a pulley 45 keyed to the input shaft 30 and a belt 46 trained around the pulley 45. The steering sensor unit may be any of various general speed detecting mechanisms such as a DC generator for producing a voltage having a level commensurate with the rotational speed of the input shaft. Since one of skill in the art can select one of such general speed detecting mechanisms as the steering sensor unit, the structure of the steering speed sensor will not be described in detail. The steering sensor unit of the illustrated embodiment produces a pair of voltage signals Ss1, Ss2 having levels which vary substantially linearly as the steering speed varies, as shown in FIG. 7, in a rotational speed range covering opposite directions of rotation. The output signals Ss1, Ss2 are the mirror images of each other, i.e., symmetrical with respect to the axis of output voltage as shown in FIG. 7. These output voltages are supplied to the ECU 44, in which the difference between the output voltages is computed as a value N indicative of the rotational speed of the steering shaft 33. The speed-indicating value N is also shown in FIG. 7.

Referring back to FIG. 1, the steering mechanism 18 also has an electric motor 48 for producing assistive power and a transmission mechanism 50 for transmitting the power from the motor 48 to the rack 22. The motor 48 is mounted on the housing 20 and has an output shaft on which a pulley 51 is mounted. The motor 48 is controlled by the ECU 44 as described later on. The transmission mechanism 50 includes a recirculating-ball arrangement combined with the rack 22. The recirculating-ball arrangement has a nut assembly 52 having a ball nut 52a. The nut assembly 52 is disposed around the rack 22 and rotatably supported in the housing 20 by means of bearings 54, 56. The rack 22 has a helical groove 22a defined in its outer peripheral surface and receiving recirculating balls 57 on which the ball nut 52a rides. When the nut assembly 52 is rotated, the rack 22 is axially moved while the recirculating balls 57 are guided by the ball nut 52a to recirculate in the ball nut 52a. The nut assembly 52 has a pulley 52b on its outer peripheral surface. A transmission belt 58 is trained around the pulley 52b and the pulley 51 on the output shaft of the motor 48. This belt-and-pully mechanism and the recirculating-ball arrangement serve to transmit the power of the motor 48 to the rack 22 while reducing the rotational speed.

The control system of the power steering system will be described with reference to FIG. 2(a). The control system includes the ECU 44 which includes a microcomputer unit (hereinafter referred to as an "MCU") 60. Various conventional microcomputers are now widely used and commercially available, and hence those skilled in the art can select such a known microcomputer suited to the operation of the invention based upon the disclosure herein. Operation of the MCU 60 will be described later on. The ECU 44 also includes a first interface 72 responsive to the output signals St1, St2 from the steering torque sensor 68 for issuing analog electric signals indicative of the present voltage levels of the output signals St1, St2, and a second interface 74 responsive to the output signals Ss1, Ss2 from the steering speed sensor 70 for issuing analog electric signals indicative of the present voltage levels of the output signals Ss1, Ss2. The analog electric signals from the interfaces 72, 74 will be denoted by the same reference characters as those of the output signals from the sensors 68, 70. The analog signals from the interfaces 72, 74 are fed to an analog-to-digital converter (hereinafter referred to as an "A/D converter") 76 which converts the supplied analog signals to digital signals. These digital signals will also be denoted by the same reference characters as those of the analog signals. The MCU 60 controls the first and second interfaces 72, 74 and the A/D converter 76 to read the digital signals St1, St2, Ss1, and Ss2 from the A/D converter 76, and supplies an alternating current to the primary winding of the steering torque sensor 68.

Figure 3:
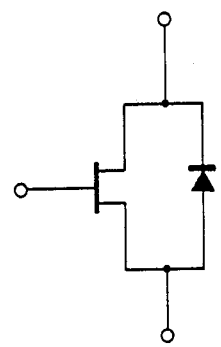
FIG. 3 is a circuit diagram of an equivalent to a field-effect transistor in the motor driver of FIG. 2.

The control system includes a motor driver 78 for driving the motor 48, the motor driver 78 comprising a bridge circuit 80 including four field-effect transistors (FETs) Q1, Q2, Q3, Q4 and an FET driver 82 for driving the FETs. Each of the FETs includes a diode incorporated integrally therein for allowing a current to flow from its source terminal to its drain terminal. Therefore, each FET is equivalent to a combination, as shown in FIG. 3, of a normal FET and a diode with its anode connected to the source terminal and its cathode to the drain terminal. The bridge circuit 80 has a pair of input and output terminals 84a, 84b. The input terminal 84a is connected via a first relay circuit 92 and other circuits to the non-grounded terminal of a power source 90, whereas the output terminal 84b is grounded. The bridge circuit 80 also has two other output terminals 85a, 85b. The output terminal 85a is connected via a second relay circuit 94 to an input terminal of the motor 48 and the output terminal 85b is connected directly to the other input terminal of the motor 48. The FET Q1 has a drain terminal connected to the input terminal 84a and a source terminal connected to the output terminal 85a. The FET Q2 has a drain terminal connected to the input terminal 84a and a source terminal connected to the output terminal 85b. The FET Q3 has a drain terminal connected to the output terminal 85a and a source terminal connected to the output terminal 84b. The FET Q4 has a drain terminal connected to the output terminal 85b and a source terminal connected to the output terminal 84b. The gate terminals of these FETs Q1 through Q4 are connected respectively to output terminals a1 through a4 of the FET driver 82. The FET driver 82 is supplied with driver control signals CS1, CS2 from the MCU 60 for controlling the FETs Q1 through Q4 through a pulse-width modulation (PWM) system to control the motor 48. The second relay circuit 94 selectively electrically connects and disconnects the bridge circuit 80 and the motor 48 under the control of the MCU 60. A current detector 96 is connected across the second relay circuit 94 and issues an analog electric signal Sim corresponding to the average value of a pulse current flowing through the second relay circuit 94 and hence the motor 48. The analog signal Sim is fed back to the A/D converter 76. The A/D converter 76 converts the analog signal Sim to a digital signal, which is then read by the MCU 60. The current detector 96 itself has a considerably high impedance which does not affect the function of the second relay circuit 94.

The control system 44 is supplied with electric power from the power source 90 which is an automobile-mounted battery. The power source 90 has a negative terminal grounded and a positive terminal connected through a common fuse 96 and an automobile key switch 98 to one end of a power steering system fuse 100 in the control system. The other end of the fuse 100 is coupled through the first relay circuit 92 to the intput terminal 84a of the bridge circuit 80. The first relay circuit 92 is controlled by the MCU 60 for selectively electrically connecting and disconnecting the fuse 100 and the motor driver 78. To the fuse 100, there is connected a constant-voltage regulated power supply 102 which supplies electric power to various elments, such as the MCU 60 and the FET driver 82, in the control system which require a regulated constant voltage.

The function of the bridge circuit 80 in the motor driver 78 will be described with reference to FIGS. 4(a) through 4(d). The bridge circuit 80 is shown in FIGS. 4(a) through 4(d) as an equivalent circuit for a better understanding. The combination of an FET Q′1 and a diode D1 corresponds to the FET Q1, and the other FETs Q2 through Q4 are also shown as being replaced with such combinations. The first and second relay circuits 92, 94 are omitted from illustration in FIGS. 4(b) through 4(e). As described above, the FETs are PWM-controlled by the FET driver 82. In order to rotate the motor 48 in a first direction, the FETs Q′1 and Q′4 are PWM-controlled whereas the FETs Q′2 and Q′3 remain de-energized (the source and drain terminals thereof are disconnected). When rotating the motor 48 in a second direction opposite to the first direction, the FETs Q′2 and Q′3 are PWM-controlled whereas the FETs Q′1 and Q′4 remain de-energized.

PWM control for rotating the motor 48 in the first direction will be described below in detail. Electric pulse trains are issued from the terminals a1, a4 of the FET driver 82. The intervals (i.e., pulse periods) between the leading edges of pulses of one of the pulse trains are constant, and the leading edges of pulses of one pulse train are in synchronism with those of pulses of the other pulse train. The pulse duration varies in a range of from "0" to "1", and the value of the pulse duration represents a ratio with respect to the pulse period. An FET which is supplied with pulses having a pulse duration of "1" is continuously energized, and an FET which is supplied with pulses having a pulse duration of "0" is continuously de-energized. An FET which is supplied with pulses having a pulse duration larger than "0" and smaller than "1" is repeatedly turned on and off at the frequency of the pulses.

Figure 4A:
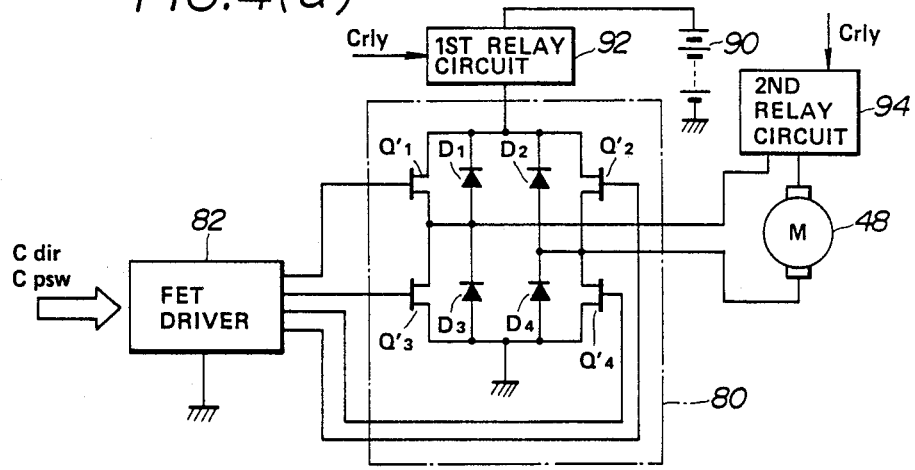
FIG. 4(a) is an equivalent circuit diagram of a bridge circuit in the motor driver of FIG. 2.
Figure 4B:
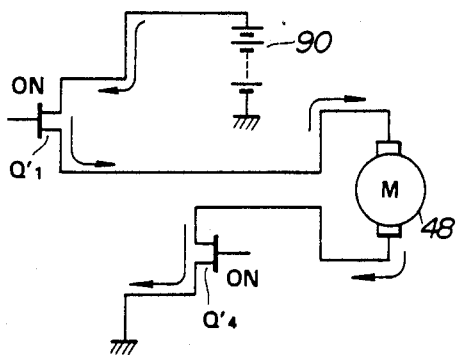
FIGS. 4(b) through 4(e) are circuit diagrams explaining operation of the bridge circuit illustrated in FIG. 4(a)
Figure 4C:
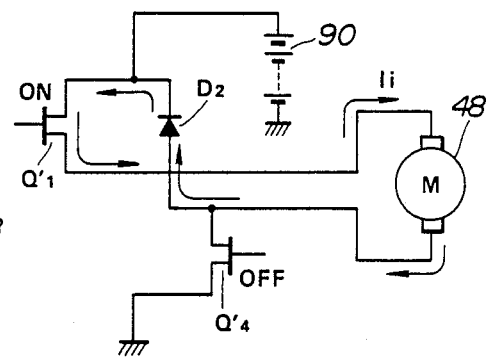
Figure 4D:
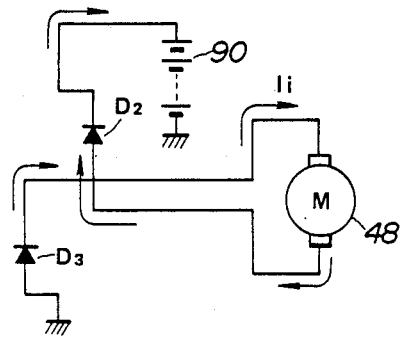

The FETs Q′1 and Q′4 under PWM control can be in one of the following four conditions: (1) The FET Q′1 is turned on and the FET Q′4 is turned on; (2) The FET Q′1 is turned on and the FET Q′4 is turned off; (3) The FET Q′1 is turned off and the FET Q′4 is turned on; and (4) The FET Q′1 is turned off and the FET Q′4 is turned off. In the condition (1), a current flows from the power source 90 to the motor 48 through a route including the FETs Q′1, Q′4 as shown in FIG. 4(b). The condition (2) arises immediately after the condition (1) under PWM control. In the condition (2), right after the current from the power source 90 to the motor 48 is cut off, the motor 48 generates an induced current Ii as shown in FIG. 4(c) and the induced current Ii passes through a low-impedance closed loop including the giode D2 and the FET Q′1. In the condition (3) similar to the condition (2), an induced current flows through a closed loop including the diode D3 and the FET Q′4. The condition (4) can happen immediately after the condition (1), (2) or (3). An induced current Ii generated by the motor 48 flows in the direction shown in FIG. 4(e) to charge the power source 90 through a route including the diodes D2, D3. When the FETs Q′2, Q′3 are turned off while they are being PWM-controlled, the induced current of the motor charges the power source through a route including the diodes D1, D4.

The FET driver 82 determines a pulse duration based on control signals from the MCU 60. The manner in which the MCU 60 produces control signals will hereinafter be described with reference to FIGS. 5(a) through 5(f) and 6 through 10. As described above, an FET is continuously energized when it is supplied with a pulse train composed of pulses having a pulse duration of "1". The torque generated by the motor is substantially proportional to the pulse duration, which corresponds to the duty ratio of the motor driver. The duty ratio will be referred to in the following description as being representative of the pulse duration.

Figures 5A, 5B:
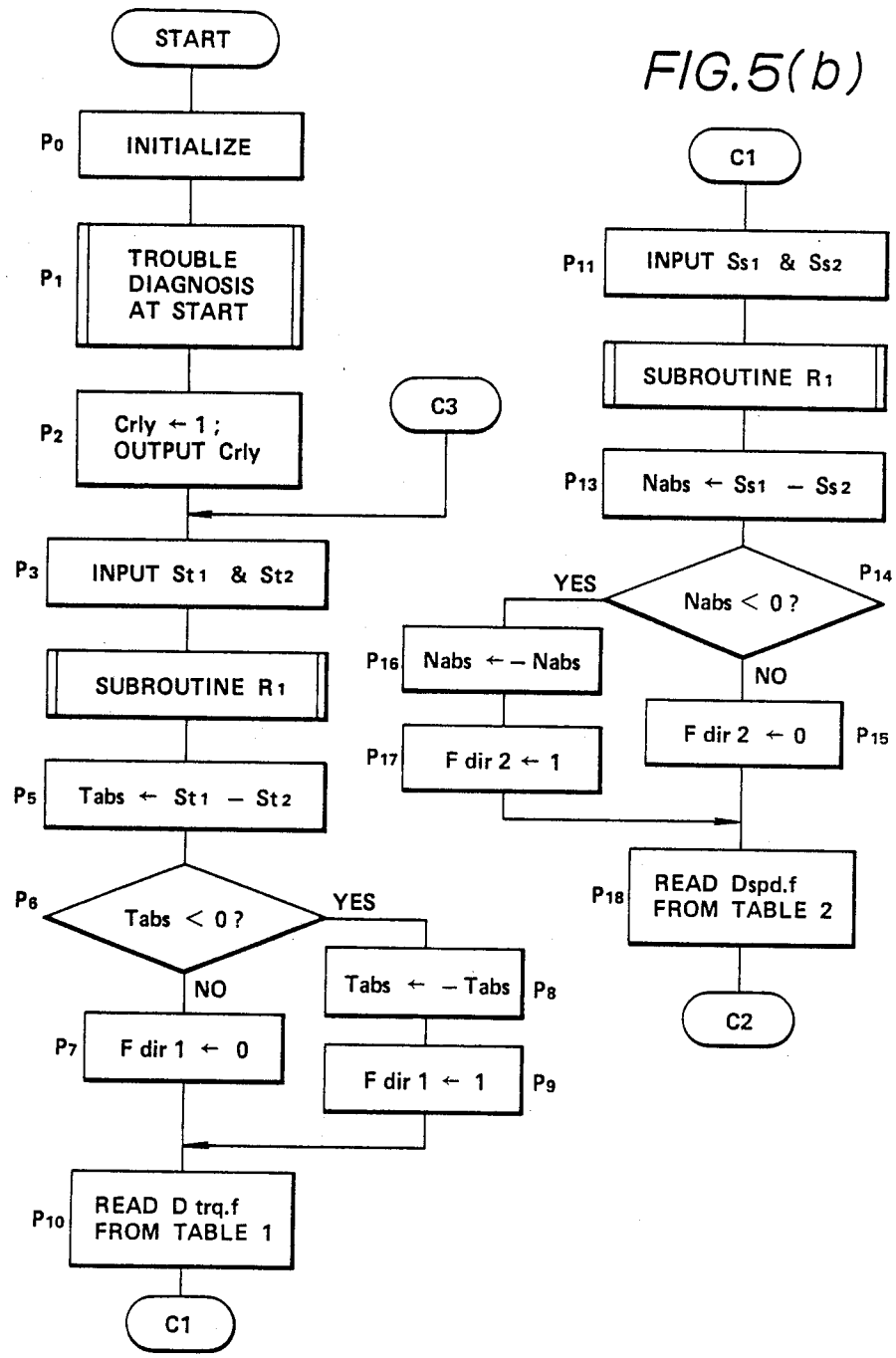

When the automobile key switch 93 is closed, the power steering system is supplied with electric power to initialize the MCU 60, clearing a random-access memory therein (step P0 in FIG. 5(a)). Then, a trouble diagnosis at the time of starting the control system is executed (step P1). In this trouble diagnosis, output signals from the steering torque sensor 68, the steering speed sensor 70, and the current detector 68 are input to the CPU 60 via the A/D converter 76, and checked in subroutines. The inputting and checking of these signals will also be effected in the subsequent process, and will be described in detail at a later time. If no trouble is found as a result of the signal checking, a control signal Crly for the first and second relay circuits 92, 94 is set to "1" and then applied to the relay circuits (step P2). The control signal Crly can be of a value of "0" or "1". If of the value of "1", the first relay circuit 92 electrically connects the bridge circuit 80 of the motor driver 78 and the fuse 100 for thereby supplying electric power to the bridge circuit 80, and the second relay circuit 94 electrically connects the bridge circuit 80 and the motor 48 for making the motor 48 ready for being driven. If of the value of "0", the first relay circuit 92 electrically disconnects the bridge circuit 80 from the power source, and the second relay circuit 94 electrically disconnects the motor 48 from the bridge circuit 80. If any trouble is found in the above signal checking, then the MCU 60 stops its operation. In a step P3, output signals St1, St2 from the steering torque sensor 68 are input to the MCU 60 via the A/D converter 76 and stored in the random-access memory of the MCU 60. Then, a sensor-output-checking subroutine R1 is executed to ascertain whether the signals St1, St2 meet a prescribed relationship. The subroutine R1 will be described later on. If the signals St1, St2 meet the prescribed relationship, then the processing goes to a step P6. If not, the processing proceeds to a stop routine R3 for stopping power assistant since the steering torque sensor 68 or other associated elements may be malfunctioning. The stop routine R3 will be described later on. Steps P5 through P9 compute data Tabs indicative of the absolute value of a steering torque applied to the steering shaft 33 and set or reset a flag Fdir1 indicative of the direction in which the steering torque is applied. In the step P5, the data Tabs is computed according to the following equation:

$$Tabs = St1 - St2 \quad (1)$$

Figure 8:
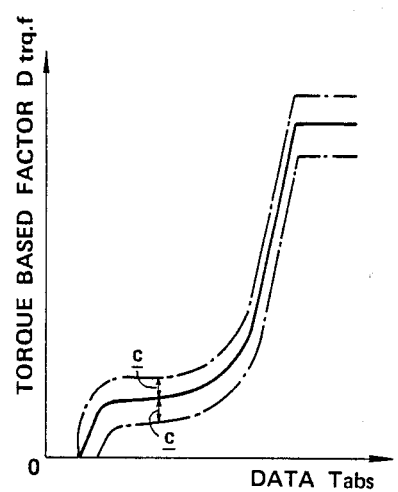
FIG. 8 is a graph illustrating the relationship between a detected steering torque and a torque-base factor for duty ratios, adopted in the control system of FIG. 2.

The value of Tabs obtained in the step P5 corresponds to the value T shown in FIG. 6, and does not necessarily indicates the absolute value thereof. The step P6 therefore ascertains whether the value of Tabs is negative or not. If negative, then the sign of the value of Tabs is changed in the step P8, and the flag Fdir1 is set in the step P9, which is followed by a step P10. In this embodiment, the flag Fdir1 is set when the automobile driver applies a counterclockwise steering torque to the steering wheel 34. If the value of Tabs is not negative, the flag Fdir1 is reset in the step P7, and the processing goes to the step P10. At the time the step P7 or P8 is executed, Tabs represents the absolute value of the steering torque. In the step P10, data Dtrq.f which is a function of the data Tabs is read out of a first data table in a read-only memory of the MCU 60, using the data Tabs as an address (or using the data Tabs as an offset value from a certain segment base). The data Dtrq.f serves as a factor for determining duty ratios for a control signal Cpsw to be issued from the MCU 60 to the FET driver 82. Stated otherwise, the data Dtrq.f is a torque-base factor for duty ratios. A certain value of the data Dtrq.f with respect to the data Tabs is pre-selected according to desired power assisting characteristics, and one example is illustrated in FIG. 8.

Then, as shown in FIG. 5(b), output signals Ss1, Ss2 from the steering speed sensor 70 are input to the MCU 60 via the A/D converter 76 and stored in the random-access memory of the MCU 60 (step P11). The subroutine R1 is executed again to check if these output signals Ss1, Ss2 meet a prescribed relationshiop. If the output signals Ss1, Ss2 meets a prescribed relationshiop, then steps P13 through P17 compute data Nabs indicative of the absolute value of the rotational speed of the steering shaft 33 and set or reset a flag Fdir2 indicative of the direction in which the steering shaft 33 is rotated. In the step P13, the data Nabs is computed according to the following equation:

$$Nabs = Ss1 - Ss2 \quad (2)$$

Figure 9:
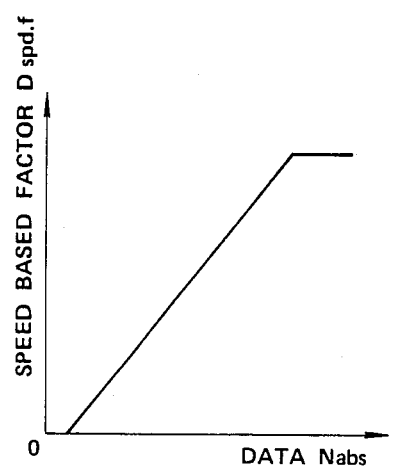
FIG. 9 is a graph illustrating the relationship between a detected steering speed and a speed-base factor for duty ratios, adopted in the control system of FIG. 2.

The value of Nabs obtained in the step P13 corresponds to the value N shown in FIG. 7, and does not necessarily indicates the absolute value thereof. The step P14 therefore ascertains whether the value of Nabs is negative or not. If negative, then the sign of the value of Nabs is changed in the step P16, and the flag Fdir2 is set in the step P17, which is followed by a step P18. In this embodiment, the flag Fdir2 is set when the steering wheel 34 is turned counterclockwise. If the value of Nabs is not negative, the flag Fdir2 is reset in the step P15, and the processing goes to the step P18. At the time the step P15 or P16 is executed, Nabs represents the absolute value of the steering speed. In the step P18, data Dspd.f which is a function of the data Nabs is read out of a second data table in the read-only memory of the MCU 60, using the data Nabs as an address (or using the data Nabs as an offset value from a certain segment base). The data Dspd.f serves as a factor for determining duty ratios for the control signal Cpsw to be issued from the MCU 60 to the FET driver 82. Stated otherwise, the data Dtrq.f is a speed-base factor for duty ratios. A certain value of the data Dspd.f with respect to the data Nabs is pre-selected primarily in view of the speed vs. induced-voltage characteristics of the power-assistive motor, and varies in most cases substantially linearly with respect to the data Nabs as shown in FIG. 9.

More specifically, a DC motor generally produces an induced voltage which is substantially proportional to the speed of rotation of the motor. When the direction in which the torque is produced by the motor and the direction of rotation of the motor are the same, the direction in which the induced voltage is generated is opposite to the direction in which the voltage from the power source is applied to the motor, and the induced voltage acts to reduce the generated torque. In a motor-driven power steering system, when the steering mechanism is to return to its neutral position, the direction in which the torque is produced by the motor and the direction of rotation of the motor are opposite to each other, and the direction in which the induced voltage is generated is the same as the direction in which the voltage from the power source is applied to the motor. Thus, the induced voltage acts to increase the generated torque. In the power steering system of the illustrated embodiment, the rotational speed of the DC motor and the rotational speed of the steering wheel are proportional to each other, and hence the rotational speed of the motor varies in proportion to the steering speed. However, the power assisting torque should not be affected by the steering speed for achieving a good steering feeling. According to the power steering system of the present embodiment, such a requirement can be met by changing the pulse duration in a compensatory fashion using the data Dspd.f, as described below.

After the step P18, a step P19 (FIG. 5(c)) ascertains whether the flags Fdir1 and Fdir2 are equal to each other or not. Subsequent steps P20 through P23 compute first and second duty ratios Dduty1, Dduty2 for a pair of FETs to be controlled, from the data items Dtrq.f and Dspd.f in view of the result of the step P19. If the flags Fdir1 and Fdir2 are equal to each other, the direction in which the torque is applied by the automobile driver to the steering wheel 34 is equal to the direction in which the steering wheel 34 is rotated. This is normally the case in which the steering wheel is turned from the neutral position or further turned from a certain angular position. In this case, the duty ratios Dduty1, Dduty2 are computed in the steps P20, P21 according to the following equations:

$$Dduty1 = Dtrq.f + Dspd.f \quad (3)$$

$$Dduty2 = 1 \quad (4)$$

If the flags Fdir1, Fdir2 are not equal to each other, the steering wheel is returned toward the neutral position. In this case, the duty ratios Dduty1, Dduty2 are computed in the steps P22, P23 according to the following equations:

$$Dduty1 = Dtrq.f \qquad (5)$$

$$Dduty2 = 1 - Dspd.f \qquad (6)$$

The MCU 60 supplies the FET driver 82 with directional data composed of two variables R, L for indicating the direction in which to apply an assistive torque. The directional data (R, L) is determined in steps P24 through P28. The step P24 ascertains whether the first duty ratio Dduty1 is "0" or not. If "0", then the variables R, L are reset to "0" in the step P26. If the duty ratio Dduty1 is not "0", then the step P25 ascertains whether the flag Fdir1 is "1" or not. If "1", then the variable R is reset to "0" and the variable L is set to "1" in the step P27. If not "1", then the variable R is set to "1" and the variable L is reset to "0" in a step P28. After the directional data (R, L) have been determined, a directional control signal Cdir indicative of the directional data is applied to the FET driver 82 in a step P29, and a pulse-duration control signal (which is the control signal Cpsw) representative of the first and second duty ratios Dduty1, Dduty2 is also applied to the FET driver 82 in a step P30. The FET driver 82 is responsive to these control signals Cdir, Cpsw for controlling the bridge circuit 80 and hence the motor 48. Thereafter, a motor-current-checking subroutine R2 is executed for ascertaining whether the data Tabs indicative of the absolute value of the steering torque and the current actually flowing through the motor 48 meet a prescribed relationship. The subroutine R2 will be described later on. If the data Tabs and the actual motor current meet the prescribed relationship, then the processing goes to the step P3 (FIG. 5(a)), i.e., the processing enters a loop. If the data Tabs and the actual motor current does not meet the prescribed relationship, the motor 48, the motor driver 78, or other associated elements may be malfunctioning, and the processing goes to the stop routine R3 in which the power assisting operation is stopped and the control system is shut off.

Figure 5D:
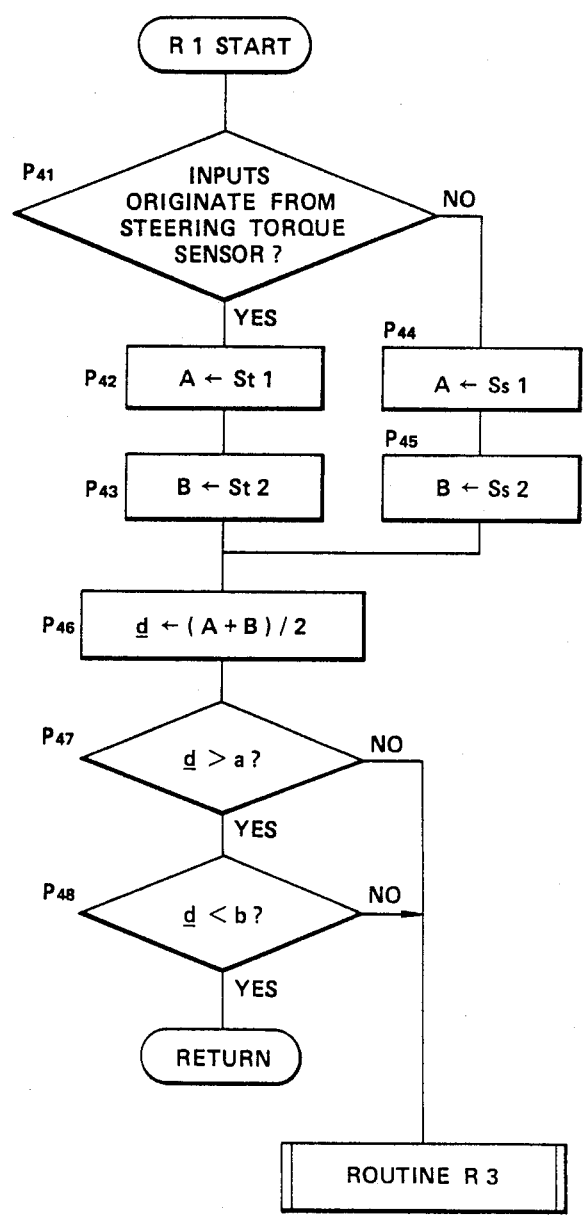

The subroutine Ra for checking the sensor output signals starts with a step P41 (FIG. 5(d)) for ascertaining whether sensor outputs applied immediately before have originated from the steerinmg torque sensor 68 or the steering speed sensor 70. The step P41 may be executed by checking the contents of a program register or checking a suitable flag which may be set when the sensor outputs have been applied immediately before. If the sensor outputs have come from the steering torque sensor 68, then the data items St1, St2 stored in the random-access memory are put respectively in variables A, B in steps P42, P43. If the sensor outputs have come from the steering speed sensor 70, then the data items Ss1, Ss2 stored in the random-access memory are put respectively in the variables A, B in steps P44, P45. Thereafter, a variable d is computed in a step P46 according to the following equation:

$$d = (A + B)/2 \qquad (7)$$

As illustrated in FIGS. 6 and 7, while the sensors 68, 70 are operating normally, the output signals St1, St2, Ss1, Ss2 are adjusted in output level so as to meet the following inequalities (8) and (9):

$$a < (St1 + St2)/2 < b \qquad (8)$$

$$a < (Ss1 + Ss2)/2 < b \qquad (9)$$

where a, b are constants. Therefore, during normal operation, the variable d is in the range of from a to b. The values of the constants a, b are pre-selected in view of operation stability of the associated elements of the steering system. Steps P47, P48 ascertain whether the variable d falls in the above range. If in the range, then the processing returns from the subroutine R1 to the main routine, and if not in the range, then the processing proceeds to the stop routine R3.

Figure 5E:
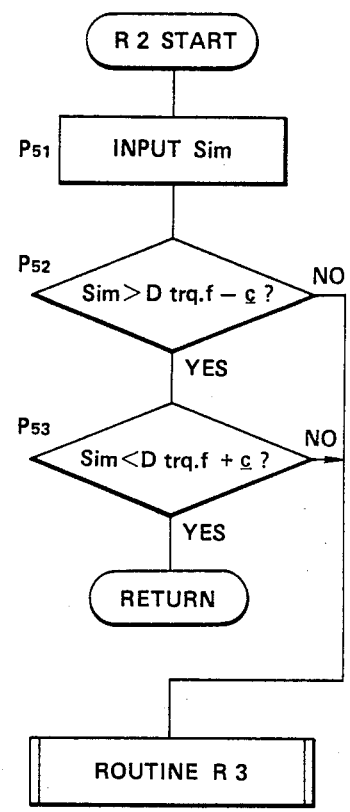

The subroutine R2 for checking the motor current begins with a step P51 (FIG. 5(e)) in which the output signal Sim from the current detector 96 is input to the MCU 60 via the A/D converter 76. The signal Sim corresponds to the average value of a pulse current flowing through the motor 48. The pulse-duration control signal Cpsw is obtained by applying compensation to the basic factor Dtrq.f of the steering torque base according to the factor Dspd.f of the steering speed base. The current flowing through the motor 48 is actually determined under the influence of the control signal Cpsw and the induced voltage of the motor. The influence of the induced voltage and the compensation according to the speed-base factor Dspd.f correspond to each other and are offset by each other. Therefore, the actual motor current corresponds to the torque-base factor Dtrq.f. Furthermore, the gain of the current detector 96 is adjusted in order to be able to compare the torque-base factor Dtrq.f with the detected current signal Sim. Steps P52, P53 ascertain whether the difference between the signal Sim and the torque-base factor Dtrq.f is smaller than an allowable value c. If smaller, then the processing returns to the main routine, and if not smaller, then the processing goes to the stop routine R3. The allowable range is illustrated in FIG. 8 as a range between dot-and-dash lines.

In the stop routine R3, as shown in FIG. 5(f), the variables R, L indicated by the directional control signal Cdir are reset to "0" (step P61), the duty ratios Dduty1, Dduty2 represented by the pulse-duration control signal Cpws are reset to "0" (step P62), and the control signal Crly for the first and second relay circuits are reset to "0" (step P63). Thereafter, these control signals are applied to the motor driver 78 and the relay circuits 92, 94 to cut off the electric power to the motor 48 (P64). A suitable trouble indication is given and the MCU 60 stops its operation. The steering mechanism is thereafter manually operated.

Figure 4E:
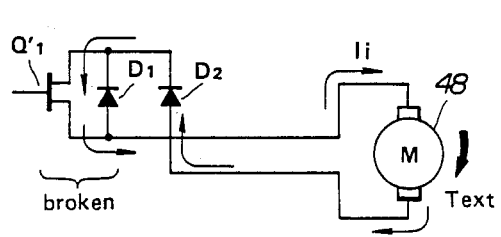

One point to be noted in the processing sequence for stopping the operation of the system according to the stop routine R is that the second relay circuit 94 is responsive to the control signal Crly for electrically disconnecting the motor 48 completely from the bridge circuit 80 of the motor driver 78. The processing enters the stop routine R3 when the MCU 60 recognizes any phenomenon which indicates the possibility of a malfunction or trouble. If such a malfunction or trouble is caused by breakage of any of the FETs Q1 through Q4 of the bridge circuit 80, resulting in conduction between the drain and source thereof at all times irrespective of a control signal applied to the gate, then disconnection of the motor 48 entirely from the bridge circuit 80 is important as follows: It is assumed that the FET Q1 is broken causing conduction between its drain and source. The bridge circuit 80 under this condition is indicated by the equivalent circuit of FIG. 4(e) (only associated elements are shown). As a result of the FET breakage, the current flowing through the motor 48 becomes different from a target value therefor. The MCU 60 recognizes such a current deviation based on the output signal Sim from the current detector 96, and stops the power assisting operation to place the steering mechanism in a manual mode according to the process as described above. When the steering mechanism is manually operated, the output shaft of the motor 48 is rotated by an externally applied torque Text, thus producing an induced current Ii. If the motor 48 is electrically connected to the broken bridge circuit 80, a short-circuiting loop for allowing the induced current to flow in the direction of the arrows in FIG. 4(e) is formed by the broken FET (the FET Q'1 or the diode D1) and the diode D2. The motor 48 now functions as an electromagnetic brake, requiring a large steering effort to manually turn the steering wheel 34. The second relay circuit 94 in the illustrated embodiment is effective in preventing such a drawback.

Figure 10:
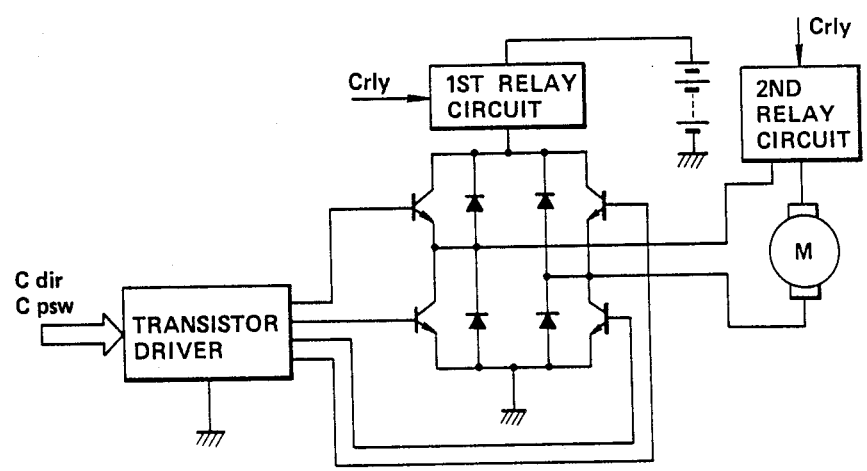
FIG. 10 is a circuit diagram of an alternative to the bridge circuit in the control system illustrated in FIG. 2.

The principles of the present invention are not limited to steering systems having a motor driver with an FET bridge circuit. The present invention is also applicable to a steering system having a bridge circuit comprising junction transistors (sometimes called "ordinary transistors") and diodes as shown in FIG. 10, and to a steering system having a bridge circuit comprising other switching elements than junction transistors.

Figure 11A:
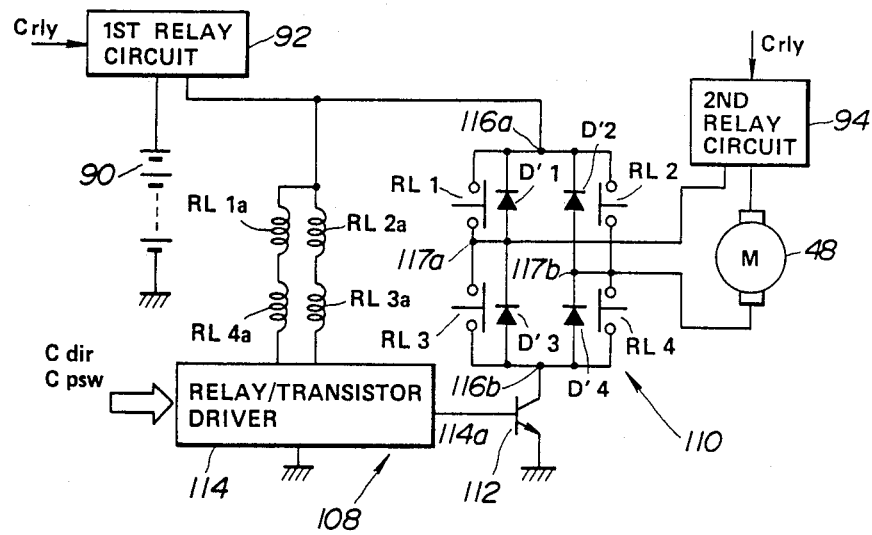
FIG. 11(a) is a circuit diagram of another alternative to the bridge circuit in the control system illustrated in FIG. 2.

FIG. 11(a) illustrates a motor driver 108 in a steering system to which the present invention is applicable. The motor driver 108 includes a bridge circuit 110 comprising four relays RL1 through RL4 and four diodes D'1 through D'4, a power transistor 112 connected to the bridge circuit 110, and a relay/transistor driver 114 for controlling the relays RL1 through RL4 and the power transistor 112. Each of the relays RL1 through RL4 has a pair of contact terminals and a solenoid for selectively connecting and disconnecting the contact terminals. The bridge circuit 110 has two input terminals 116a, 116b and two output terminals 117a, 117b. One of the contact terminals of the relay RL1 is connected to the input terminal 116a, whereas the other contact terminal is connected to the output terminal 117a. The diode D'1 is connected across the relay RL1, with its cathode coupled to the input terminal 116a and its anode to the output terminal 117a. One of the contact terminals of the relay RL2 is connected to the input terminal 116a, whereas the other contact terminal is connected to the output terminal 117b. The diode D'2 is connected across the relay RL2, with its cathode coupled to the input terminal 116a and its anode to the output terminal 117b. One of the contact terminals of the relay RL3 is connected to the output terminal 117a, whereas the other contact terminal is connected to the input terminal 116b. The diode D'3 is connected across the relay RL3, with its cathode coupled to the output terminal 117a and its anode to the input terminal 116b. One of the contact terminals of the relay RL4 is connected to the output terminal 117b, whereas the other contact terminal is connected to the input terminal 116b. The diode D'4 is connected across the relay RL4, with its cathode coupled to the output terminal 117b and its anode to the input terminal 116b. The input terminal 116a of the bridge circuit 110 is connected to the power source 90 via the first relay circuit 92 (which is the same as the first relay circuit shown in FIG. 2) and other elements (not shown in FIG. 11(a)). The solenoid RL1a of the relay RL1 and the solenoid RL4a of the relay RL4 are connected in series to each other, and are simultaneously driven by the relay/transistor driver 114. Similarly, the solenoid RL2a of the relay RL2 and the solenoid RL3a of the relay RL3 are connected in series to each other, and are simultaneously driven by the relay/transistor driver 114. The power transistor 112 is of the NPN type having a collector terminal connected to the input terminal 116b of the bridge circuit 110, an emitter terminal grounded, and a base terminal connected to the output terminal 114a of the relay/transistor driver 114. The output terminal 117a of the bridge circuit 110 is coupled to the motor 48 through the second relay circuit 94 (which is the same as the second relay circuit shown in FIG. 2), and the other output terminal 117b is coupled directly to the motor 48.

Figures 11B, 11C:
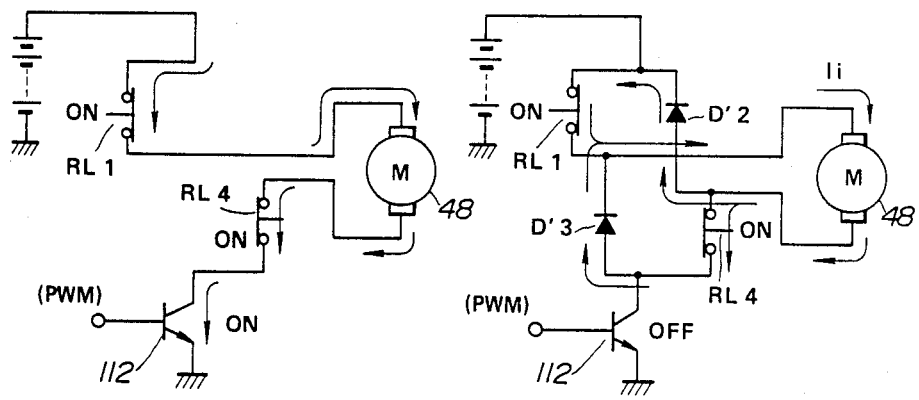
FIGS. 11(b) through 11(d) are circuit diagrams explaining operation of the motor driver shown in FIG. 11(a).

The relay/transistor driver 114 PWM-controls the power transistor 112 based on a pulse-duration control signal Cpsw from the MCU 60, and also controls relays based on a directional control signal Cdir. FIGS. 11(b) and 11(c) show the flow of a current for rotating the motor 48 in a first direction, with the relay circuits being omitted from illustration. Under PWM control, the power transistor 112 is switchingly operated so as to be turned on and off repeatedly at short periods. With the power transistor 112 turned on, electric power is supplied from the power source 90 via the relays RL1, RL4 to the motor 48. With the power transistor 112 turned off, the motor 48 produces an induced current Ii immediately after the power from the power source to the motor 48 has been cut off, and the induced current Ii flows through a closed loop comprising the relay RL1 and the diode D'2a and a closed loop comprising the relay RL4 and the diode D'3.

Figure 11D:
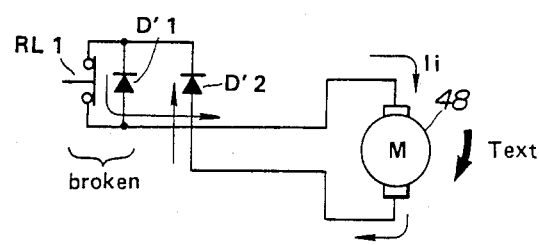

When any of the relays is broken providing a conduction path or any of the diodes is broken allowing a current to flow in an opposite direction therethrough, it may be possible for a closed loop to remain formed for providing a short circuit across the opposite terminals of the motor 48 thereby to cause the motor 48 to function as an electromagnetic brake. For example, when the relay RL1 or the diode D'1 is broken, if it were not for the second relay circuit, a closed loop would be formed by the diode D'3 and the broken relay RL1 or diode D'1 for allowing the induced current Ii produced by the torque Text externally applied to the output shaft of the motor 48 to flow in the direction shown in FIG. 11(d). Consequently, the present invention is effectively applicable to a steering system having a driver circuit which employs the bridge circuit 110.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motor-driven power steering system comprising:
   a steering mechanism;
   an electric motor operatively coupled to said steering mechanism for generating assistive steering power;
   a power source;
   motor driver means connected to said power source for driving said motor;
   control means for controlling said motor driver means; and switch means for selectively electrically connecting and disconnecting said motor driver means and said motor, wherein said motor driver means includes an arrangement capable of cooperating with said motor in forming a closed loop for allowing an induced current produced in said motor to flow therethrough when the steering system is subjected to a trouble, and wherein said switching means comprises a relay circuit controlled by said control means for selectively electrically connecting and disconnecting said motor driver means and said motor.

2. A motor-driven power steering system according to claim 1, wherein said motor driver means comprises a bridge circuit, said bridge circuit comprising two input terminals, two output terminals, and four bridge branches connected between said terminals.

3. a motor-driven power steering system according to claim 2, wherein each of said bridge branches comprises a field-effect transistor incorporating a diode therein.

4. A motor-driven power steering system according to claim 1, wherein said steering mechanism includes a steering wheel to which a steering torque can be applied, said control means comprising steering torque sensor means for issuing a signal indicative of the steering torque applied to said steering wheel, steering speed sensor means for issuing a signal indicative of the speed of rotation of said steering wheel, and current detector means for issuing a signal indicative of a current flowing through said motor, said control means being arranged such that when at least one of said signals indicates a failure as detected by said control means, said control means operates said relay circuit to electrically disconnect said motor from said motor driver.

5. A motor-driven power steering system according to claim 4, further including another switch means for selectively electrically connecting and disconnecting said power source and said motor driver means.

6. a motor-driven power steering system according to claim 2, wherein each of said bridge branches comprises a switching element controlled by said control means and a diode connected parallel to said switching element.

7. A motor-driven power steering system according to claim 2, wherein each of said bridge branches comprises an electrical combination selected from the group consisting of: (a) a combination of a switching element controlled by the control means and a diode connected parallel to the switching element and (2) a field-effect transistor incorporating a diode therein.

* * * * *